United States Patent [19]

Gillick et al.

[11] Patent Number: 4,824,692
[45] Date of Patent: Apr. 25, 1989

[54] PROCESS FOR THE SURFACE TREATMENT OF UNSATURATED RUBBER BY PHOTOCHEMICAL MODIFICATION WITH ALKYL HALIDES

[75] Inventors: James G. Gillick, Akron; Walter H. Waddell, Fairlawn, both of Ohio

[73] Assignee: The Goodyear Tire & Rubber Company, Akron, Ohio

[21] Appl. No.: 78,326

[22] Filed: Jul. 27, 1987

[51] Int. Cl.$^4$ .................. B05D 3/06; C08C 19/12; C08F 8/18
[52] U.S. Cl. .................. 427/53.1; 427/54.1; 522/67; 522/113; 525/359.5
[58] Field of Search .................. 427/54.1, 53.1, 40; 522/67, 113; 525/359.5

[56] References Cited

U.S. PATENT DOCUMENTS

| | | | |
|---|---|---|---|
| 2,386,448 | 10/1945 | Dreisbach | 522/67 |
| 3,356,762 | 12/1967 | Holly | 525/359.5 |
| 3,619,246 | 11/1971 | Bragole | 427/54.1 |
| 3,843,502 | 10/1974 | Pearson et al. | 522/67 |
| 3,989,611 | 11/1976 | Shurpik | 522/67 |
| 4,162,354 | 7/1979 | Pearson et al. | 522/67 |

Primary Examiner—Norman Morgenstern
Assistant Examiner—Marianne Padgett
Attorney, Agent, or Firm—Henry C. Young, Jr.

[57] ABSTRACT

This invention is concerned with a process for the surface treatment of a rubber containing ethylenic unsaturation by coating the rubber with an alkyl halide and exposing the thus coated rubber surface to ultraviolet-visible light. Such modification produces a rubber article having reduced air permeability, enhanced ozone protection and improved release properties.

9 Claims, No Drawings

PROCESS FOR THE SURFACE TREATMENT OF UNSATURATED RUBBER BY PHOTOCHEMICAL MODIFICATION WITH ALKYL HALIDES

TECHNICAL FIELD

This invention relates to a process for the surface treatment of a vulcanized or unvulcanized rubber containing ethylenic unsaturation. More particularly it relates to a process for the surface treatment of a rubber containing carbon to carbon double bonds by coating the rubber with an alkyl halide and thereafter exposing the thus coated rubber to ultraviolet-visible radiation. The process of this invention produces a rubber article with improved adhesion, flame retardation, and antipermeability.

BACKGROUND ART

It is well known that rubbers are permeable to gases. As such the use of rubber in articles of manufacture such as hoses, tires and airsprings has presented a problem of gas retenion over the years. One approach to achieving enhanced air retention in a rubber article, such as a tire, has been to line the interior of the tire with an innerliner such as bromobutyl rubber.

In an effort to achieve a reduction in the total tire weight it has been proposed to eliminate the innerliner compound. The primary purpose of this innerliner component is to maintain tire air pressure and the innerliner compounds have been formulated with the intention of low air permeability in mind. However, there are problems associated with the manufacture of tires using a bromobutyl rubber innerliner; one of which is the high cost of the bromobutyl rubber. Other problems include air trapped between plies, adhesion to the stock contained in the tire and the adhesion of the bromobutyl innerliner to the curing bladder during the vulcanization process. In an effort to eliminate the use of these innerliners, a process has been proposed to reduce the air permeability of the carcass compound. A portion of the instant invention is directed to a process for directly modifying the surface of a rubber compound so as to enhance its ability to prevent the transmission of gaseous materials therethrough. A direct rubber surface modification technique would be valuable since the bulk physical properties of the rubber compound would remain unaffected and such an application could be readily incorporated into tire manufacturing either to a green calendared compound, to the green tire or to the cured tire.

In an effort to enhance the antipermeability of rubber compounds, the inventors herein have investigated numerous techniques and procedures which would afford an air impermeable barrier and allow for the reduction in total tire weight.

U.S. Pat. No. 3,632,400 describes a process for coating a surface of a rubber article comprising the in situ formed polymerization product of a compound such as 1,1-dihydroheptafluorobutyl acrylate which is bonded to the rubber surface through use of an electron beam having an average potential of about 100,000 volts. Through this radiation grafting of fluorine containing acrylates the patent discloses that the elastomer has improved solvent resistance, abrasion resistance, low coefficient of friction, is oxidatively stable and is thermally stable.

U.S. Pat. No. 3,793,298 is concerned with a method for halogenizing surfaces of synthetic and/or natural rubber materials. Specifically the '298 patent is concerned with a method for halogenating surfaces of a rubber with a halogen donor to make such surfaces better glueable to rubber or their materials. The process disclosed therein comprises contacting the rubber with an acidified solution of a N-halogen sulfonamide in an organic solvent in which said sulfonamide is soluble and which is substantially inert to the action of the halogen. After application of the solution to the rubber substrate the solvent is evaporated and the surface is thus halogenated so as to enhance the adhesion between the rubber and other materials.

Canadian Pat. No. 931,907 is concerned with the treatment of polychloroprene rubber with radiation having a wavelength between 2,000 and 3,500 Angstroms. The resulting articles have extremely low coefficients of friction, but retain their normal flexibility and hardness properties. This Canadian patent further teaches that including small amounts of surfactant in the compounding of the rubber produces a still lower coefficient of friction after radiation. In addition, this Canadian patent teaches that instead of compounding the surfactant into the elastomer, the surfactant may be coated on the formed article prior to irradiation. The materials coated on the rubber such as perfluoroalkyl sulfonate surfactants have been found to be useful.

Chemical Abstracts 90: 7327d discloses that in contrast to thermal chlorination, fluorination, or sulfochlorination at 80° C. the radiation initiated reactions of nitrile rubber, butadiene rubber, neoprene rubber and EPDM with chlorine and fluorine give elastic surfaces. These reactions are gas diffusion rate-controlled and occur only on the surface of the rubbers. This article is primarily concerned with the surface treatment of rubbers through the use of gaseous molecular halogens.

Chemical Abstracts, 81: 64889b discusses the chlorination of butyl rubber by gaseous chlorine in the presence of dibenzoylperoxide and ultraviolet radiation. This process introduces =CHCl and —CH$_2$Cl groups into the rubber molecule.

U.S. Pat. No. 3,968,316 discloses a process for the surface treatment of a rubber or synthetic resin containing ethylenic unsaturation by contacting the rubber or resin with an alkyl hypohalite and a compound containing an active halogen and a functional group thereby improving or providing the rubber or resin with improved properties such as adhesion, printability, dyeability, flame retardation, antistatic properties, ion-exchangeability and antipermeability.

U.S. Pat. No. 3,940,548 is concerned with the process for treating the surfaces of shaped articles of rubber which comprises contacting the surfaces of the shaped rubber articles containing carbon to carbon unsaturated double bonds with an alkyl hypohalite. The alkyl hypohalites used for the surface treatment include the tertiary alkyl hypohalites such as tertiary butyl hypohalite, tertiary amyl hypohalite and the like. The process disclosed in the '548 patent requires the immersion of the rubber article in a solution of the tertiary hypohalite after which the sheets are washed and then dried.

The prior art does not suggest or disclose the instant invention which provides a simple process for enhancing numerous physical properties of a rubber through the treatment with an alkyl halide and the subsequent irradiation with ultraviolet-visible light.

DISCLOSURE OF THE INVENTION

There is disclosed a process for the surface treatment of a rubber containing ethylenic unsaturation comprising (1) coating said rubber with an alkyl halide of the following structural formula:

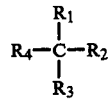

wherein at least two of $R_1$, $R_2$, $R_3$, $R_4$ are halogen atoms and the remaining radicals are selected from hydrogen and alkyl of 1 to 6 carbon atoms; and (2) irradiating the thus coated rubber with ultraviolet-visible light under conditions and for a time sufficient to provide for the surface modification of the rubber.

There is also disclosed a process for the surface treatment of a cured or uncured rubber article comprising: (1) coating said rubber article with tribromomethane; (2) irradiating the thus coated rubber article with ultraviolet-visible light for at least 2 minutes at a distance of about 5 cm from the article to the ultraviolet-visible light source.

There is further disclosed an improved air impermeable rubber, said rubber being prepared by the process comprising: (1) coating a cured or uncured solid rubber selected from the group comprising natural rubber, polyisoprene, polybutadiene, butadiene isoprene copolymers, styrene butadiene copolymers, acrylonitrile butadiene copolymers, acrylonitrile butadiene isoprene terpolymers, ethylene propylene diene terpolymers, polychloroprene, and isobutylene isoprene copolymers and blends thereof with an alkyl halide selected from the group consisting of dichloromethane, trichloromethane, dibromomethane, tribromomethane, diiodomethane, triiodomethane, tetrachloromethane, and tetrabromomethane; (2) irradiating the thus coated rubber with ultraviolet-visible light under conditions and for a time sufficient to improve the air impermeability of the rubber.

One aspect of the present invention resides in the discovery that the process recited herein can be used to alter the surface of rubber compounds to tailor their physical properties to meet specific needs without affecting the bulk polymer properties. The present invention employs a photochemically generated reactive derivative of alkyl halides which will modify the surfaces of the rubber compounds. In general the process of the instant invention is accomplished by spraying the alkyl halide onto the rubber surface and exposing the surface to ultraviolet-visible light (hereinafter UV). It has been found that such modification according to the instant invention results in reduced air permeability, enhanced ozone protection and improved release properties from the vulcanization bladder. As discussed previously the instant invention allows for the elimination of the conventionally used innerliners in tubeless pneumatic tires through a process which reduces the air permeability of the carcass compounds.

The direct rubber surface modification technique of the instant process does not adversely effect the bulk physical properties of the rubber compound. Further, the process of this invention is readily incorporated in tire manufacturing processes by either applying the alkyl halide to a green calendared compound, to the green tire and/or the cured tire.

The rubber to be treated in accordance with the invention may be shaped articles of rubber containing carbon to carbon unsaturated double bonds in the rubber molecule. Useful rubbers include natural rubber, polyisoprene, polybutadiene, butadiene isoprene copolymers, styrene butadiene copolymers, acrylonitrile butadiene copolymers, acrylonitrile butadiene isoprene terpolymers, ethylene propylene diene terpolymers, polychloroprene, and isobutylene isoprene copolymers and blends thereof. These rubber materials may contain conventional additives such as vulcanizing agents, antidegradants and the like. Additionally a reinforcing agent, filler, softener, plasticizer and other known additives to facilitate processing can be used when suitably selected according to the intended utility of the rubber articles.

The di-, tri- and tetra-halo-alkyls found useful in the process of the invention include dichloromethane, trichloromethane, dibromomethane, tribromomethane (hereinafter bromoform), diiodomethane, triiodomethane, tetrachloromethane, tetrabromomethane, and the like.

The ultraviolet-visible light (UV) useful in this invention is that region of the electromagnetic spectrum including wavelengths from 100 to 5500 Å. Practically, the UV should be from 1000 to 5500 Å ($1.0 \times 10^{-7}$ to $5.5 \times 10^{-7}$ m).

The times and conditions for irradiation can be widely varied depending upon the power of the UV source and the distance of the UV source from the article. Usually a distance of from 1-25 cm is acceptable and a time of from 2 minutes to an hour has been found adequate.

According to the invention these halo-alkyls may be used as is or as solutions in organic solvents. Suitable solvents include aliphatic hydrocarbons such as heptane, normal hexane and cyclohexane, aromatic hydrocarbons such as benzene, nitrobenzene, halogenated benzene, toluene and xylene, ethers such as diethylether and dioxane, esters such as ethyl acetate, ketones such as methyl ethyl ketone and cyclohexanone, chlorinated hydrocarbons such as ethyl chloride, chloroform and carbon tetrachloride, tertiary alcohols such as isopropyl alcohol, and carbon disulfide. These solvents may be used as mixtures. When the halo-alkyl is used in the form of a solution dissolved in any of these solvents, the concentration of the halo-alkyl present in the solution is not limited particularly, but selected suitably according to the properties to be imparted to the shaped rubber article. It is generally preferable that the concentrations be at least 50% by weight.

The invention may be practiced either by immersing the rubber articles in the halo-alkyl or by coating or spraying the halo-alkyl onto the rubber article. In the former embodiment the immersion time varies depending on such factors as the type of rubber, concentration of the halo-alkyl solution, type of solvent and the intended utility of the rubber article, but normally ranges from one second up to ten minutes, preferably from three seconds to five minutes. The temperature at which the halo-alkyl is contacted with the surface of the rubber article is from 0° C. to the boiling point of the halo-alkyl or the solution thereof, but preferably from 0° to 30° C. Ambient temperatures have been found to be adequate and are preferred.

It is thus possible according to this invention to improve the impermeability of the rubber and also advantageously improve degradative resistance. Because the reaction reaches relatively shallow depths into the surface layer, the bulk properties of the rubber substrate are not adversely impacted. The shaped articles of rubber treated in accordance with this invention have the wide utilities known for rubber in general, especially for use in the interior of a pneumatic tire to enhance its resistance to the diffusion of gases such as oxygen and nitrogen.

This invention will be better understood by the following examples which are submitted to illustrate but not to limit the scope thereof.

EXAMPLES 1-12

Numerous organic chemicals were investigated for their ability to photograft to the rubber surface and afford an air impermeable barrier. In this example cured (24 minutes at 150° C.) passenger tire carcass compounds were sprayed with a number of chemicals. A 10% by weight acetone solution of the organic chemicals listed in Table I were sprayed directly onto a test sheet of the rubber compound in a crisscross pattern which consisted of a horizontal followed by a vertical application sufficient to cover the entire test sheet. The thus coated rubber compounds were irradiated from a distance of about 20 cm with unfiltered light from a 450 watt low pressure mercury bulk for 30 minutes. The test sheets were evaluated for permeability to air using an untreated compound as a control. The permeability test was conducted in accordance with ASTM No. D1434.

The carcass compound was a blend of natural rubber, polybutadiene and SBR and is set out below:

| Carcass Compound | |
|---|---|
| | phr |
| Natural Rubber | 70 |
| Polybutadiene | 15 |
| Oil extended SBR | 18.75 |
| Carbon black | 50.0 |
| Processing aids | 8.0 |
| Resin system | 2.75 |
| Zinc oxide | 3.0 |
| Stearic acid | 1.0 |
| Antioxidants | 2.0 |
| Accelerator | 0.95 |
| Sulfur | 2.0 |

TABLE I

Air Permeability Data for Cured Carcass Compound

| Ex # | Chemical Applied | Air Permeability (Normalized) + | % Reduction |
|---|---|---|---|
| 1 | Allyl bromide | 88 | 12 |
| 2 | Allyl glycidyl ether | 82 | 18 |
| 3 | Vinyl trichlorosilane | 78 | 22 |
| 4 | Allyl trimethylsilane | 82 | 18 |
| 5 | Azidomethyl phenyl sulfide | 91 | 9 |
| 6 | Bromoform (CHBr$_3$) | 26 | 74 |
| 7 | Butadiene sulfone | 70 | 30 |
| 8 | Divinyl sulfone | 92 | 8 |
| 9 | Hexanedioldiacrylate | 80 | 20 |
| 10 | Triiodomethane | 80 | 20 |
| 11 | Diiodomethane | 77 | 23 |
| 12 | Control (untreated) | 100 | N/A |

+ Standardized to a fixed thickness of the test sheet.

EXAMPLES 13-15

In a manner similar to Examples 1-12 uncured carcass rubber stock was coated, irradiated and evaluated after curing. Table II sets out the results.

TABLE II

| Ex # | Chemical Applied | Air Permeability (Normalized) + | % Reduction |
|---|---|---|---|
| 13 | Vinyltrichlorosilane | 87 | 13 |
| 14 | Bromoform | 71 | 29 |
| 15 | Control (untreated) | 100 | — |

+ Standardized to a fixed thickness of the test sheet.

The data indicate that the surface treatment (spray application of an organic chemical followed by UV irradiation) of cured and uncured carcass compounds resulted in decreases in air permeability. It is quite surprising from the data contained in Tables I and II that of all the chemicals surveyed only bromoform afforded a substantial reduction in air permeability.

Simple irradiation (no spray application) had absolutely no effect upon air permeability of green or cured carcass sheets. Evidence of the chemical reaction is derived from reductions in the air permeability of cured carcass sheets with the most significant reduction being 74% resulting from bromoform treatment.

EXAMPLES 16-21

In these examples the permeability of a rubber compound to air was investigated as it relates to the amount of bromoform deposited on the substrate, the number of applications of bromoform to the substrate and the length of treatment with UV. Treated surfaces were characterized by using energy dispersive analysis of X-rays and proton induced X-ray emission to determine effectiveness of the treatments. Thus the variables examined include the concentration of the bromoform deposited, the solvent and the UV exposure time.

Solutions of bromoform were sprayed directly onto a cured sheet of the rubber compound. Two different lamp assemblies were used to expose the rubber surface to UV and induce the photochemical reaction. Static exposure of the coated rubber surface was provided by an unfiltered radiation from a 450 watt low pressure mercury arc lamp with the sample mounted at a distance of 20 cm from the bulb. The second UV source was a Fusion Systems conveyor assembly traveling at 20 feet per minute (0.1 m/sec) with the sample passing under three ten inch (25.4 cm) bulbs placed in series, each rated at 300 watts per inch (118 watts/cm) of bulb for a total of 3,000 watts total power per bulb. Longer exposure times with the conveyor system were accomplished by repeated passes under the lamps.

The amount of bromoform deposited on the rubber surface was varied by increasing the number of spray applications using a 10% by weight solution of bromoform in acetone. Table III sets out the air permeabilities measured for a series of cured rubber samples that were treated with bromoform and exposed to UV.

TABLE III

Bromoform Treated Cured Carcass Stock

| Ex # | Number of Sprays | Number of UV Exposures* | Time/ Exposure (min) | Permeability % of Control + |
|---|---|---|---|---|
| 16 (Control) | 0 | 0 | 0 | 100 |

TABLE III-continued

| | Bromoform Treated Cured Carcass Stock | | | |
|---|---|---|---|---|
| Ex # | Number of Sprays | Number of UV Exposures* | Time/ Exposure (min) | Permeability % of Control + |
| 17 | 1 | 1 | 15 | 85 |
| 18 | 1 | 1 | 30 | 57 |
| 19 | 2** | 2 | 15 | 35 |
| 20 | 2** | 2 | 30 | 38 |
| 21 | 2*** | 1 | 30 | 25 |

*Static lamp - 450 watts.
**Sample was sprayed then exposed and then sprayed again and exposed a second time.
***Sample was sprayed with twice the amount of bromoform that is applied in a single application.
+ Standardized to a fixed thickness of test sheet.

The data indicate that longer exposure to UV favors reduced air permeability (Example 17 v. Example 18). Multiple bromoform applications favor reduced air permeability (Examples 19–21). Also, a single bromoform application at twice the usual amount prior to a single exposure reduces the air permeability further than does attempting to deposit the same amount of bromoform in two successive spray/UV exposure cycles.

EXAMPLES 22–25

Using the procedure described for Examples 16–21, a set of experiments were performed using green rubber stock. In order to eliminate mold adhesion problems encountered during cure the fully treated surfaces were laid against a second rubber sheet, either treated or untreated, before curing. As set out in Table IV, a first sheet was prepared and then a second sheet was prepared as described in the Table and then the two treated surfaces were placed treated face to treated face and then cured. As observed in the original screening experiments, treatment of green stock did not have as great an effect in reducing air permeability as did corresponding treatment of cured rubber stock. The results obtained by treatment of green stock parallel those with the cured stock in terms of the effects of the amount of bromoform deposited and the exposure time to UV.

TABLE IV

| | Bromoform Treated Green Carcass Stock | | | | | | |
|---|---|---|---|---|---|---|---|
| | Sheet #1 | | | Sheet #2 | | | |
| Ex # | Sprays | UV* | Exposure Time (min) | Sprays | UV* | Exposure Time (min) | % of Control + |
| 22 (Control) | 0 | 0 | 0 | 0 | 0 | 0 | 100 |
| 23 | 2** | 2 | 30 | 0 | 0 | 0 | 70 |
| 24 | 2 | 1 | 30 | 0 | 0 | 0 | 61 |
| 25 | 1 | 1 | 30 | 1 | 1 | 30 | 39 |

*Number of exposures to 450-watt static lamp
**Sample was sprayed and then exposed and then sprayed again and exposed a second time.
+ Standardized to a fixed thickness of test sheet.

It was observed that separate treatment of each sheet of the two ply composite resulted in a much greater reduction in the air permeability than was observed upon applying all the bromoform to only one sheet of the composite (Example 24 v. Example 25).

EXAMPLES 26–32

These experiments were designed to study the effects of single and double applications of chloroform, 10% solutions by weight of bromoform and acetone and 50% solutions by weight of bromoform in chloroform on a green carcass stock. The carcass stock for these experiments was as follows:

| Carcass Compound | phr |
|---|---|
| Natural rubber | 70 |
| Oil extended SBR | 41.25 |
| Processing aids | 10 |
| Carbon black | 50 |
| Resin system | 2.25 |
| Zinc oxide | 1 |
| Sulfur | 2.25 |
| Accelerator | 0.80 |

The data is set out in Table V.

TABLE V

| | Treated Green Carcass Stock* | | |
|---|---|---|---|
| Ex # | Solution | Sprays | % of + Control |
| 26 | Chloroform | 1 | 89 |
| 27 | Chloroform | 2 | 88 |
| 28 | 10% Bromoform/Acetone | 1 | 83 |
| 29 | 10% Bromoform/Acetone | 2 | 86 |
| 30 | 50% Bromoform/Chloroform | 1 | 84 |
| 31 | 50% Bromoform/Chloroform | 2 | 85 |
| 32 | Control (no treatment) | 0 | 100 |

*Samples exposed for 30 minutes to 450-Watt static lamp
+ Standardized to a fixed thickness of test sheet.

Characterization of several bromoform treated rubber surface was undertaken to determine the extent to which bromoform derived species had modified the rubber surface. Energy dispersive analysis of X-ray measurements were performed and it was determined that substantial modification of the surface occurred while no penetration of bromine into the bulk of the rubber occurred. Thus, the bromoform/UV treatment is a true surface modification procedure. Glass transition temperature measurements were conducted on the treated compounds and it was determined that no change in the bulk properties was observed relative to an untreated control.

Six common laboratory solvents ranging in polarity from the nonpolar solvent hexane to the highly polar solvent ethyl acetate were selected to determine the effect of solvent on the reaction. A 50% by volume solution of bromoform was prepared with each solvent. Each solution was sprayed onto the surface of a test sheet in the manner described previously. The treated sheets were then exposed to UV. The treated green rubber sheets were cured against Teflon sheeting prior to air permeability measurements which utilized the procedure similar to the physical test laboratory standard air diffusion test ASTM No. D1434.

The results of this air permeability testing indicated that solvents of moderate polarity such as acetone and tetrahydrofuran provided the greatest reduction in air permeability. The nonpolar solvents such as toluene and hexane and the highly polar ethyl acetate and isopropanol solvents were not as effective.

An additional experiment was conducted wherein a second bromoform/UV treatment to a cured rubber sample which had been previously treated prior to curing led to no additional reduction in air permeability. This implies that the first treatment chemically modified most of the surface reactive sites and thus limits the effectiveness of a second application of the bromoform.

EXAMPLE 33

The use of different polymer types was investigated through the preparation of several rubber compounds. Polybutadiene, polyisoprene, styrene/butadiene, natural and EPDM rubber were compounded with the same ingredients and cure package except the amount of cure package was adjusted to result in vulcanizates of similar modulus. Cured sheets were treated with a 50% by volume bromoform solution in acetone and exposed to UV.

The results indicated that EPDM was much less affected by bromoform treatment than the unsaturated polymers which suggest that the olefinic bonds in the polymer are the primary site of the bromoform/UV chemical reaction. The permeability of polybutadiene rubber is greatly reduced by bromoform/UV treatment but still remains at a very high level. Polyisoprene rubber and solution SBR undergo similar reductions in air permeability. In a similar fashion bromoform/UV treatments of natural rubber and emulsion SBR were performed and both evidenced significant reductions in air permeability with natural rubber being more strongly effected.

A number of experiments were conducted to investigate the treatment of the instant invention on polymer blends. A number of polyisoprene/SBR blends were prepared and treated as described above along with controls. Air permeability studies demonstrated a steady drop in the air permeability as the percentage of SBR is increased in the controls (untreated). Evaluation of treated blends indicated a minimum permeability for the 60% polyisoprene/40% SBR blend.

EXAMPLES 34-38

These experiments were conducted to determine if combining the bromoform/UV treatment with a latex coating technique to a rubber article would further reduce permeability to air. Five latex coatings were evaluated with and without the bromoform/UV treatment. The thickness of the latex coating and the base stock were also varied. Experimental samples were prepared by spreading the latex on a sheet of green carcass stock and air drying overnight. The composite sheets (stock and latex) were then cured for 24 minutes at 150° C., sprayed with bromoform and exposed to UV for 15 minutes using a 450 watt mercury vapor lamp. In each case the average air permeability of two bromoform treated samples was compared against the average of two untreated samples. The results show that bromoform/UV treatment did indeed substantially lower the air permeability of the latex coated carcass stocks. The values obtained for a set of composites in which 7 mils ($1.8 \times 10^{-4}$ m) of latex was coated on 25 mils ($6.4 \times 10^{-4}$ m) of a carcass compound are shown in Table XI.

TABLE XI

Air Permeability of Bromoform/UV Treated Latex/Carcass Composites[a]

| Ex # | Latex | Air Permeability Untreated % of Control + | Bromoform/ UV Treated % of Control + |
|---|---|---|---|
| 34 | Control[c] | 100 | N/A |
| 35 | SBR | 89 | 18 |
| 36 | PSBR* | 82 | 13 |
| 37 | NBR | 28 | 5 |
| 38 | NIR** | 15 | 4 |

[a]7 mil ($1.8 \times 10^{-4}$ m) of latex on 25 mil ($6.4 \times 10^{-4}$ m) of compound set out on page 14.
[c]35 mil ($8.9 \times 10^{-4}$ m) of compound set out on page 14.
*Vinyl pyridine/styrene butadiene.
**Acrylonitrile isoprene copolymer.
+ Standardized to a fixed thickness of test sheet.

Without bromoform/UV treatment only the nitrile latices were effective in reducing the air permeability. With bromoform/IV treatment significant reductions in air permeability were obtained for all of the composites with the nitrile latices being the most effective.

Variations in the method of bromoform application and in the thickness of the composite layers had a pronounced effect on the overall air permeability. It was noted that the thickness of the carcass and the latex layers were less important to the air permeability than was the technique used to apply bromoform to the surface. It has been discovered that a carefully uniform application of bromoform to the top layer of the composite was necessary to provide the greatest drop in air permeability. Treatment of the composite with bromoform/UV before curing provided no added benefit.

In a like fashion to the experiments above, a 50/50 blend based on weight of carboxylated nitrile latices and an SBR latex were tested on a carcass compound. It was apparent that the use of a blend of latices is clearly more efficient in reducing air permeability than is use of the SBR latex alone.

EXAMPLE 39

Tire Study

P185/65-R13 radial passenger tires were constructed using conventional materials and techniques except the bromobutyl innerliner was omitted. The interiors of the tires were sprayed with nitrile latex to give a 50–70 micron thick coating after air drying. The tires were cured, then sprayed on the interior with bromoform and exposed to a high-intensity UV to effect reaction. The tires were mounted, inflated to 50 psig ($3.4 \times 10^5$ Pa) and placed in a 120° F. (49° C.) oven. The drop in air pressure over the course of 19 days was noted and used to calculate an average air loss rate. The average loss rate for untreated tires was 0.38 psi/day ($2.6 \times 10^3$ Pa) while for the treated tires it was 0.26 psi/day ($1.8 \times 10^3$ Pa).

EXAMPLE 40

Tire Study

P195/75-R14 radial passenger tires were constructed using conventional materials and techniques except the bromobutyl innerliner was omitted. The interiors of the tires were sprayed with a nitrile latex formulation to give a 50–70 micron thick coating after air drying. Some of the tires were then immediately sprayed on the interior with bromoform and exposed to UV generated by the Fusion Systems unit, followed by thermal curing. The remaining tires were first cured and then subjected to bromoform/UV treatment.

EXAMPLE 41

Tire Study

P195/75-R14 radial passenger tires were constructed with an NR/SBR compound in place of the bromobutyl innerliner. Some of the tires were sprayed on the interior with bromoform and exposed to UV generated by the Fusion Systems unit, followed by thermal curing. The remaining tires were first cured and then subjected to bromoform/UV treatment.

Industrial Applicability

There is a need in the rubber industry to enhance the air impermeability of rubber compounds. Further, there is a need in the tire industry to lower the cost of production and the weight of the finished article while enhancing the final physical properties of the tire. Through the process of the instant invention great improvements can be made in the air impermeability of rubber compounds. Further, through the use of the instant invention, tires may be constructed without the conventional halobutyl innerliner which will reduce the cost of production and lessen the overall weight of the tire.

What is claimed is:

1. A process for the surface treatment of a rubber containing ethylenic unsaturation comprising: (1) coating said rubber with an alkyl halide of the following structural formula:

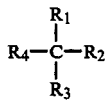

wherein at least two of $R_1$, $R_2$, $R_3$, $R_4$ radicals are halogen atoms and at least one is a hydrogen radical and the remaining radical is either a halogen or a hydrogen atom; and (2) irradiating the thus coated rubber with ultraviolet-visible light under conditions and for a time sufficient to provide for the surface modification of the rubber, wherein said rubber is selected from at least one of natural rubber, polyisoprene, polybutadiene, butadiene isoprene copolymers, styrene butadiene copolymers, acrylonitrile butadiene isoprene terpolymers, polychloroprene, and isobutylene isoprene copolymers and blends thereof.

2. A process according to claim 1 wherein the alkyl halide is selected from the group consisting of dichloromethane, trichloromethane, dibromomethane, tribromomethane, diiodomethane, and triiodomethane.

3. A process according to claim 1 wherein the ultraviolet-visible light has a wavelength selected from $1.0 \times 10^{-7}$ to $5.5 \times 10^{-7}$ m (1000 to 5500 Å).

4. A process according to claim 1 wherein the irradiation of the coated rubber article is conducted for from 2 minutes to 1 hour.

5. The process of claim 1 where said rubber is the interior surface of a pneumatic tire.

6. The process of claim 1 where said rubber is the surface of an airspring.

7. A process according to claim 1 for the surface treatment of a cured or uncured rubber, where said rubber is the interior surface of a pneumatic tire, comprising: (1) coating said rubber surface with tribromomethane; (2) irradiating the thus coated rubber with ultraviolet-visible light.

8. A process according to claim 7 wherein the rubber article is a tire.

9. An improved air impermeable rubber, said rubber being prepared by the process comprising: (1) coating a cured or uncured solid rubber selected from the group comprising natural rubber, polyisoprene, polybutadiene, butadiene isoprene copolymers, styrene butadiene copolymers, acrylonitrile butadiene copolymers, acrylonitrile butadiene isoprene terpolymers, ethylene propylene diene terpolymers, polychloroprene, and isobutylene isoprene copolymers and blends thereof with an alkyl halide selected from the group consisting of dichloromethane, trichloromethane, dibromomethane, tribromomethane, diiodomethane, and triiodomethane, (2) irradiating the thus coated rubber with ultraviolet-visible light under conditions and for a time sufficient to improve the air impermeability of the rubber.

* * * * *